United States Patent [19]

Williams et al.

[11] Patent Number: 5,370,939
[45] Date of Patent: Dec. 6, 1994

[54] YELLOWING RESISTANT, AIR-DRYING COATING COMPOSITION CONTAINING ALLYLOXYPROPOXYLATE

[75] Inventors: Roy C. Williams, Raleigh; Kyu-Jun Kim, Chapel Hill, both of N.C.

[73] Assignee: Reichhold Chemicals, Inc., Durham, N.C.

[21] Appl. No.: 977,811

[22] Filed: Nov. 17, 1992

[51] Int. Cl.$^5$ .................... B32B 27/36; C08G 63/48
[52] U.S. Cl. .................... 428/482; 528/272; 528/274; 528/280; 528/295.5; 528/296; 528/297; 528/301; 528/302; 528/303; 528/308; 525/437; 525/438; 525/444.5; 524/176; 524/220; 524/221; 524/270; 524/313; 524/601; 524/765; 106/14.22; 106/14.28; 106/222
[58] Field of Search .......... 528/272, 274, 280, 295.5, 528/296, 297, 301, 302, 303, 308; 525/437, 438, 444.5; 524/176, 220, 221, 270, 313, 601, 765; 106/14.22, 14.28, 222; 428/480, 482

[56] References Cited

U.S. PATENT DOCUMENTS

| | | | |
|---|---|---|---|
| 4,005,041 | 1/1977 | Piggott | 528/75 |
| 4,091,052 | 5/1978 | Horii et al. | 525/245 |
| 4,156,667 | 5/1979 | Turpin | 523/501 |
| 4,195,102 | 3/1980 | Turpin | 427/486 |
| 4,317,894 | 3/1982 | Lewarchik et al. | 525/455 |
| 4,670,308 | 6/1987 | Knapczyk | 427/350 |
| 4,745,141 | 5/1988 | Akiyama et al. | 523/500 |
| 4,760,111 | 7/1988 | Ambrose | 524/738 |
| 4,997,480 | 3/1991 | Rao | 106/251 |

FOREIGN PATENT DOCUMENTS

| | | |
|---|---|---|
| 0234641 | 9/1987 | European Pat. Off. |
| 0315920 | 5/1989 | European Pat. Off. |
| 2190672 | 11/1987 | United Kingdom |

OTHER PUBLICATIONS

J. of the Oil and Colour Chemists' Association, vol. 48, No. 11 (1965).
J. of Applied Polymer Science, vol. 42, 2681-2689 (1991).
J. of Polymer Science, Polymer Chemistry, vol. 29, 1639-1644 (1991).
Paint Technology, pp. 17-21 (Apr., 1962).
J. of Applied Polymer Science, vol. 32, pp. 3177-3187 (1986).

*Primary Examiner*—Samuel A. Acquah
*Attorney, Agent, or Firm*—Michael L. Dunn

[57] ABSTRACT

An alkyd resin comprising allyloxypropanol and unsaturated drying oil compound residues in the resin chain. The invention further includes the method for manufacturing the resin and coatings made therefrom.

21 Claims, No Drawings

YELLOWING RESISTANT, AIR-DRYING COATING COMPOSITION CONTAINING ALLYLOXYPROPOXYLATE

BACKGROUND OF THE INVENTION

Alkyd resins have been widely used as coating materials over the years due to their many desirable physical properties and low material cost. Especially, architectural varnishes and enamels which require high gloss have predominately adopted the solvent based alkyds. However, rising health and environmental concerns over organic compound emission from solvent based paints has resulted in strict regulation on the amount of volatile organic compounds (VOC) emitted from paint after being applied.

In order to comply with such challenging regulations, many research efforts have been exerted toward developing water-borne and high solids coatings which employ far lower amounts of organic solvents than conventional coatings.

Water-borne coatings which use water as a dispersing medium are mainly latexes and water-dispersible resins. Although showing an impressive success in replacing organic solvent coatings in many applications, water-borne coatings have not been able to satisfy the coating industry's needs completely because of their inherent problems such as insufficient gloss, water sensitivity, and the difficulty of controlling water evaporation after application.

As a result, other high solids systems, which employ less organic solvent than the conventional ones, have also been gaining a lot of attention. Since viscosity usually increases dramatically with a decrease in amount of solvent, it has often been necessary for high solids systems to use lower resin molecular weights to maintain a workable paint viscosity. Due to possible adverse effects on coating properties caused by low molecular weight, additional functionality, which may build up the coating molecular weight after application is usually required for such high solids systems.

It is well known that alkyds form a crosslinked structure through an oxidation of unsaturated fatty acid at ambient conditions after being applied on a substrate. In order to offset lower molecular weights than conventional resins, high solids alkyds require an increased level of unsaturated fatty acids, which may be considered as the functional component in alkyd, to ensure enough crosslinking to achieve acceptable coating properties. One of the major drawbacks in such high solids alkyds is severe yellowing development in the cured coatings due to the increased level of unsaturated fatty acids. Oxidation of fatty acid double bonds is accompanied by development of yellow color bodies.

In order to overcome such problems, the polyhydroxy based allyl ethers have been incorporated into alkyds to replace a part of or all the fatty acids. Allyl ether compounds undergo oxidation as does unsaturated fatty acid; however, such oxidation does not cause yellowing in the cured coatings. However, the synthesis of polyhydroxy based allyl ethers usually results in a statistical distribution of allyl ether functionality in polyhydroxy compounds due to the reaction between monofunctional allyl compound and multi-functional hydroxy compound. This makes it quite difficult to design a low-VOC resin since the heterogeneity in hydroxy functionality will broaden molecular weight distribution. Furthermore, since the two starting raw materials, allyl alcohol and polyhydroxy compound, react reluctantly with each other, the need of special processes and/or catalysts in the synthesis of polyhydroxy based allyl ethers often results in high raw material cost.

Due to their oxidation ability to form a crosslinked coating at ambient condition without leading to yellowing, allyl ether compounds have been either incorporated into the coating resins as chemical building blocks or blended physically with unsaturated polymers.

The general oxidation chemistry of allyl ether compounds is well known and can be found in various literature, for instance, "Allyl ethers in solventless and water-based coatings", Journal of the Oil and Color Chemists' Association, Vol. 148 (II), 1025 (1965); "Effects of chemical structure of allyl ethers on polymerization and properties of multi-functional acrylate systems", Journal of the Applied Polymer Science, 42, 2681 (1991), "Influence of allyl ethers in coating resins", Journal of Polymer Science, Polymer Chemistry Ed., 29, 1638 (1991).

Numerous prior literature reveals the chemical incorporation of allyl ether compounds into polyesters or alkyds ("Air-drying oil free polyether-esters", Paint Technology, Apr. 17, 1962: U.S. Pat. Nos. 4,670,308; 4,745,141; 4,997,480; European Patent Application 0234641), polyurethanes (U.S. Pat. No. 4,760,111, and European Patent Application 0315920), reactive diluent (U.S. Pat. No. 4,091,052 and UK Patent Application GB 2,190,672) and epoxy ("Surface coatings based on water-soluble epoxy allyl ether polymers systems", Journal of the Applied Polymer Science, 32, 3177 (1986). However, all the allyl ether compounds used as chemical building blocks in the literature were polyhydroxy based allyl ethers.

The following three patents disclose a certain allyl ether alcohol compound as a useful compound to prepare certain specific coating compositions, but not to the preparation of alkyd compositions.

U.S. Pat. Nos. 4,156,667 and 4,195,102 reveal an allyl ether alcohol dispersing solvent for an aqueous polyester and aminoplast system. A baking process at 120°–130° C. was employed to incorporate allyl ether alcohol into a coating composition through the reaction with aminoplast resin. Since allyl ether alcohol is physically blended with a coating material, purge was required prior to application to minimize volatility and toxicity problems. No air-drying coating composition with chemically bound allyloxypropanol, i.e. O-allyl polypropylene glycol, is mentioned.

U.S. Pat. No. 4,005,041 disclosed air-drying or heat curable polyurethane coating compositions prepared with allyl ether hydroxy compounds. Although allyl oxypropanol is suggested as a possible allyl ether hydroxy compound, all the examples were limited to trimethylolpropane diallyl ether (TMPDAE). Since strong hydrogen bonding in polyurethanes contributes significantly to improving their physical properties, polyesters and alkyds need a different molecular structure in order to achieve desired coating properties. This structure becomes more important when a monofunctional allyl oxypropanol is employed in place of a multifunctional allyl compound such as trimethylolpropane diallyl ether (TMPDAE) as it usually provides better dry and hardness because of its high crosslinking density in a cured film.

In addition, the air-drying polyurethane compositions in U.S. Pat. No. 4,005,041, includes no air-drying oil or fatty acid. The addition of castor oil, which mostly consists of non-drying fatty acid, was suggested as a plasticizer in order to improve flexibility. Therefore, the present invention combining an air-drying fatty acid (oil) and allylether compound is not suggested by U.S. Pat. No. 4,005,041 in which only air-drying polyurethanes using an allylether is described.

In summary, none of the above prior art publications reveal an air-drying alkyd composition or structure including chemically bound an allyloxy propanol.

Due to their oxidation ability to form a crosslinked coating at ambient condition without leading to yellowing, the allyl ether compounds have been either incorporated into the coating resins as chemical building blocks or blended physically with unsaturated polymers.

BRIEF DESCRIPTION OF THE INVENTION

The present invention relates to novel air-drying alkyd coating compositions based on allyloxypropanol.

Problems associated with the polyhydroxy based allyl ethers may be avoided by the use of allyloxypropanol. The 1:1 equivalency between allyl ether and hydroxy functionality in alyloxypropanol eliminates local gelation and remaining unreacted allyl ether compounds in the resin, which is highly probable for alkyd resins prepared with polyhydroxy based allylethers because of the existence of both polyhydroxy allylethers and hydroxy free allyl ethers in the reaction mixture.

Another advantage in using allyloxypropanol exists in its synthesis process. Since allyl alcohol and propylene oxide, the two raw materials for allyloxypropanol, may react readily at moderate conditions, the synthesis process is relatively straightforward and usually does not require special and expensive catalyst. As a result, in most cases, allyloxypropanol are more economical than the polyhydroxy based allyl ethers.

The invention therefore comprises an alkyd resin comprising a resin chain including residues of an allyloxypropanol and an unsaturated drying oil compound selected from the group consisting of a drying oil, a fatty acid, a fatty acid ester, fatty acid salts and mixtures thereof.

The invention further comprises the method for the manufacture of the alkyd resin and coating compositions comprising the alkyd resin.

The novel allyloxypropanols of the invention have the general formula

CH$_2$=CH—CH$_2$—R—OH where R is a mixture of

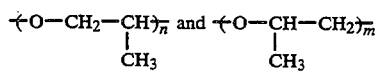

where n+m is an average of greater than 1 and often, but not necessarily, less than 10.

DETAILED DESCRIPTION OF THE INVENTION

The present invention relates to an air-drying alkyd composition with excellent drying characteristics and yellowing resistance prepared with from 10 to 70 percent by weight of allyloxypropanols, and a drying oil compound.

The preferred alkyd resins of the invention comprise the reaction product of a mixture comprising from 10 to 50 percent by weight of solids of allyloxypropanol, and from 10 to 50 percent by weight of solids of drying oil compound. The allyloxypropanol may be introduced into the alkyd by prereaction with an acid, or an anhydride and reacting the resulting prereaction product with drying oil compound. A particularly suitable anhydride for such prereaction is, for example, trimellitic anhydride.

The reaction mixture may also include 0 to 50 weight percent aromatic acid, 0 to 30 weight percent aliphatic acids and from 0 to 30 percent by weight polyhydroxy compound. Unless otherwise clear from the context herein, all percentages are by weight of solids.

The most preferred alkyd composition for the present invention includes from 25 to 50 percent by weight of drying oil compound, from 10 to 40 percent by weight of allyloxypropanols, from 5 to 30 percent by weight of aromatic acids, and from 5 to 20 percent by weight of polyhydroxy compounds.

The incorporation of more than the preferred oil content could result in the coatings of poor hardness and severe yellowing, while the incorporation of less than the preferred oil content could result in coatings of excessively high viscosity and insufficient surface dry.

The incorporation of more than the preferred allyloxypropanol content could result in coatings of poor surface dry, while the incorporation of less than the preferred allyloxypropanol content could result in coatings of insufficient yellowing resistance and through dry.

The incorporation of more than the preferred aromatic acid content could result in coatings of excessively high viscosity, while the incorporation of less than the preferred aromatic acid content could result in coatings of poor hardness and slow dry.

The amount of polyhydroxy compounds should be adjusted to control the molecular weight of the alkyd prepared with drying oil compound, allyloxypropanol, and aromatic acid.

The resin may contain from 0 to 50 percent by weight of organic solvent, most preferably, mineral spirits, to achieve a workable viscosity for application. In case an air-drying resin in the present invention has low viscosity, it may be blended with conventional alkyd as reactive diluent. In accordance with the present invention, the resin compositions of the invention preferably contain less than 10 and more preferably less than 5 weight percent volatile organic solvent.

The allyloxypropanols of this invention can be represented by the following general structure, in which n plus m is greater than one.

CH$_2$=CH—CH$_2$—R—OH where, R is a mixture of

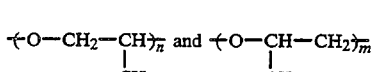

The allyloxypropanol useful for the invention may be produced by reacting allyl alcohol and propylene oxide in the presence of catalyst. The molecular weights are determined by the molar ratios of the two reagents, and their hydroxy groups may be primary, secondary, or mixtures thereof depending on the catalyst used for the addition reaction.

It is generally known that an acid catalyst leads to a mixture of primary and secondary alcohols while a base catalyst leads to predominately secondary alcohols. Both primary and secondary alcohol containing allyloxypropanols are useful for the present invention although more extended heating is required to react secondary alcohol with carboxy group.

Useful aromatic acids for the present invention may be monocarboxylic, dicarboxylic, or tricarboxylic. Examples of aromatic acids are benzoic acid, phthalic acid, phthalic anhydride, isophthalic acid, terephthalic acid, trimellitic anhydride, and the like. Useful aliphatic acids for the present invention include 1,6-cyclohexyldicarboxylic acid, succinic acid, adipic acid, azaleic acid, sebacic acid, maleic anhydride, succinic anhydride, hexahydrophthalic anhydride, tetrahydrophthalic anhydride, and the like. The term "acid" is intended to include acid anhydrides.

"Drying oil compound" as used herein means an unsaturated oil, fatty acid, fatty acid ester, fatty acid salt, and mixtures thereof which will crosslink upon exposure to air. Examples of such oils are linseed oil, safflower oil, tung oil, soybean oil, sunflower oil, and the like. Unsaturated fatty acids may be considered drying oils when they cure or harden upon exposure to air. Maleinized fatty acids may be formed by the Diels-Alder reaction and/or the "ene" reaction between maleic anhydride and unsaturated fatty acids.

Polyhydroxy compounds useful for the present invention may be difunctional, trifunctional, tetrafunctional, or mixtures thereof.

Examples of diols are 1,2-ethylene glycol, 1,4-butanediol, 1,4-cyclohexyldimethanol, neopentyl glycol, 2-methyl-1,3-propanediol, 1,6-hexanediol and the like. Examples of polyhydroxy compounds having a functionality of three or more are glycerol, trimethylol propane, trimethylol ethane, penta-erythritol, and the like.

The useful alkyd for the present invention may be prepared by means of a single step process or a multi-step process. "Single step process" as used herein means that the entire synthesis is performed continuously at the same reactor without interruption. "Multi-step process" as used herein means that the entire synthesis comprises a multitude of individual steps which require separate reactors.

The coating composition may contain 0.01 to 5 parts by weight of a drying catalyst, e.g., heavy metal salts of organic carboxylic acid such as cobalt naphthenate, manganese naphthenate, cobalt stearate, and the like or up to 10 parts by weight of organic peroxide, to accelerate the crosslinking.

The coating composition of the present invention may contain various pigments and ingredients generally known in the coating industry.

The coating composition can be applied to a substrate by conventional techniques such as spraying, dipping, direct roll coating, and brushing. The coated substrate is allowed to cure at ambient conditions or may optionally be cured at elevated temperature.

The following examples serve to illustrate and not limit the present invention.

EXAMPLES

The General Analytical Methods

The Non-Volatile Content was determined as the weight percent of residue remaining after evaporation of the same in 110° C. oven for 1 hour. The sample was diluted with xylene before being placed in an oven to facilitate the evaporation of volatiles.

The Acid Value, defined as the number of milligrams of potassium hydroxide necessary to neutralize the acid in one gram of sample, was determined with 0.2N potassium hydroxide in methanol as titrant, phenolphthalein as an indicator, and toluene-isopropanol mixture as diluting solvent (ASTM D1980, ASTM D 1639).

The Viscosity was measured at 25° C. in a water bath with a Gardner-Holdt Bubble Viscometer. The time required for the bubble to travel between two marks on the tube in seconds numerically equals the viscosity in stokes (ASTM D 1545).

The Gardner-Color is the color of transparent liquids by comparison with standards of specified colors, Gardner-Delta Comparator (CG-6750). The color of the sample is the number of the standard most closely matching the sample. The higher number indicates the darker color of the sample (ASTM D 1544).

EXAMPLE 1

Synthesis of Allyloxypropanol with an Acid Catalyst

| Component | Grams |
| --- | --- |
| A) Allylalcohol | 1700 |
| propylene oxide | 300 |
| B) Concentrated Sulfuric acid | 5.5 |
| C) Sodium hydroxide | 11 |
| Water | 13 |

Component A was introduced into a three liter reaction flask equipped with a reflux column. While under a nitrogen stream with stirring, Component B was added to the reactor, dropwise over 5 minutes. The occurrence of reaction upon the addition of the acid catalyst was demonstrated by an immediate exotherm. After being stirred for 6 hours without heat, the reactor was heated to 85° C. Heating continued for 1 hour and the temperature was lowered to 40° C. for the addition of Component C to neutralize the sulfuric acid. Excess allylalcohol was removed from the reactor by heating at 120° C. until no distillate was observed. The resulting product was purified by vacuum distillation and the total weight of allyloxypropanol was 380 g. This example shows that allyloxypropanol may be prepared from allylalcohol and propylene oxide with an acid catalyst.

EXAMPLE 2

Synthesis of Reactive Diluent with Allyloxypropanol from Example 1.

| Component | Grams |
| --- | --- |
| A) Allyloxypropanol from Example 1 | 343 |
| Dibutyltin diacetate | 0.6 |
| Toluene | 10 |
| B) Trimellitic anhydride | 177 |
| C) Mineral spirits | 10 |

Component A was added to a reactor equipped with a Barrett type water collector filled with saturated sodium chloride solution and toluene. The temperature was increased to 110° C., then Component B was added to the reactor. The temperature was maintained until the contents in the reactor became clear. The temperature was raised to 204° C. and held until the AV (acid value) reached below 10. The product was cooled and diluted with Component C. The prepared reactive diluent had an NV (non-volatile content) of 96.4, AV (solids) of 8.9, Viscosity of 3.7 stokes, and Gardner Color of 13+.

The prepared reactive diluent was mixed with one weight percent of a 45 weight percent solution of Cobalt Neodecanoate in a mixture of a complex of emulsifier, propylene glycol ethers, and mineral spirits. The mixture was applied on a glass at a 1.5 mil thickness. The times for set, dry through and dry hard, measured by a Gardner Circular Dry Time Apparatus were 8 hours, 12 hours, and 19 hours, respectively. Although the reactive diluent dries somewhat slowly, probably due to the absence of drying oil, this example clearly demonstrates that the novel allyloxypropanolated compound is able to air-dry with a conventional metal drier.

EXAMPLE 3

Synthesis of Coating Resin Containing Allyloxypropanolated Reactive Diluent.

Step A. Synthesis of reactive diluent

| Component | Grams |
| --- | --- |
| A) Allyloxypropanol (n + m = 1.43) | 665 |
| Dibutyltindiacetate | 1 |
| Toluene | 29 |
| B) Trimellitic anhydride | 333 |

(n and m in allyloxypropanol represent the repeating unit of

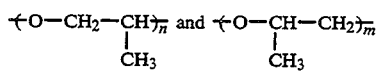

as previously described.)

Component A was charged into a two liter reaction flask equipped with a Barrett type water collector filled with saturated NaCl solution designed to separate refluxing allyloxypropanol from forming water. The reactor was heated to 204° C. under a nitrogen stream. The temperature was maintained until AV (acid value) reached 30 while collecting water. After toluene was removed by heating at 210° C., the reactor was cooled to room temperature. The resulting reactive diluent had an NV of 96.3, AV (solids) of 26.9, Viscosity of 3.9 stokes, and G.C. (Gardner Color) of 12+.

Step B. Synthesis of alkyd to be blended with reactive diluent

| Component | Grams |
| --- | --- |
| A) Sunflower Oil | 2121 |
| Trimellitic anhydride | 274 |
| Isophthalic acid | 356 |
| Triphenylphosphite | 6 |
| B) Water | 16 |
| C) Trimethylolpropane | 427 |
| D) Mineral spirits to 90 NV | 311 |

Component A was charged into a five liter reaction flask equipped with a reflux column. The reactor was heated to 204° C. Component B was added dropwise while preventing foaming. The temperature was raised to 246°–252° C., then held for about 1 hour until AV ranges between 150 and 175. The reactor was cooled to 177° C., then Component C was introduced. The temperature was raised again to 246°–252° C. Nitrogen gas sparge was employed to remove the forming water from the reactor. The mixture is held until AV falls below 10. The product was cooled to 176° C. and diluted with Component D to 90 NV (Non-Volatiles). The resulting alkyd had an NV of 91.0, AV (solids) of 6.2, Viscosity of 307 stokes, and G.C. of 8+.

Step C. Blending of alkyd with reactive diluent

| Component | Grams |
| --- | --- |
| Reactive diluent from Step A | 286 |
| Alkyd from Step B | 145 |

The blend had an NV of 90.5, AV (solids) of 13.5, Viscosity of 37.0 stokes, and G.C. of 10+. This is an example of an alkyd composition prepared with 43% drying oil, 23% allyloxypropanol, 9% polyol, and 25% aromatic acid by blending a conventional alkyd and allyloxypropoxylated reactive diluent.

EXAMPLE 4

Synthesis of Coating Resin Containing Allyloxypropoxylated Reactive Diluent

Step A. Synthesis of reactive diluent

| Component | Grams |
| --- | --- |
| A) Trimellitic anhydride | 688 |
| Allyloxypropanol (n + m= 1.71) | 770 |
| Triphenylphosphite | 5 |
| Dibutyltindiacetate | 5 |
| B) Allyloxypropoxylate (n + m= 1.71) | 1150 |

Component A was charged into a three liter reaction flask equipped with a Barrett type water collector filled with saturated NaCl solution. The reactor was heated to 210° C. under a nitrogen stream. The temperature was maintained until AV approached 20. The resulting reactive diluent had an NV of 83.9, AV (solids) of 19.8, Viscosity of 1.1 stokes, and G.C. of 11+.

Step B. Synthesis of alkyd to be blended with reactive diluent

| Component | Grams |
| --- | --- |
| A) Pamolyn 240 | 974 |
| mono-pentaerythritol | 304 |
| Isophthalic acid | 332 |
| Dibutyltindiacetate | 4 |
| B) Mineral Spirits to 90 NV | 152 |

Component A was charged into a three liter reaction flask. The temperature was increased to 232°–238° C. and held until AV fell below 10. The product was cooled to 190° C. and diluted with Component B to 90 NV. The resulting alkyd had an NV of 90.7, AV (solids) of 2.4 and G.C. of 6+.

Step C. Blending of alkyd with reactive diluent

| Component | Grams |
| --- | --- |
| Reactive diluent from Step A | 200 |
| Alkyd from Step B | 300 |

The blend had an NV of 88.2, AV (solids) of 9.3, Viscosity of 34.3 stokes, and G.C. of 9. This is an example of an alkyd composition prepared with 35% drying fatty acid, 31% allyloxypropanol, 11% polyol, and 23% aromatic acid by blending a conventional alkyd and allyoxypropanolated reactive diluent.

EXAMPLE 5

Synthesis of Coating Resin Which is a Blend of the Allyloxypropanol Modified Alkyd and the Allyloxypropanol Modified Reactive Diluent Step A. Synthesis of allyloxypropanol modified reactive diluent

| Component | Grams |
| --- | --- |
| A) Trimellitic anhydride | 200 |
| Allyloxypropanol (n + m = 1.94) | 178 |
| Triphenylphosphite | 1.5 |
| Hypophosphoric acid | 1.5 |
| B) Allyloxypropanol (n + m= 1.94) | 355 |

Component A was charged into a two liter reaction flask equipped with a Barrett type water collector filled with water and toluene. After the temperature was raised to 204° C. and maintained for 1 hour, Component B was added into a reactor through an addition funnel over 6 hours while collecting water. The temperature was maintained at about 204° C. until AV approached 30, then lowered to room temperature. The resulting reactive diluent has an NV of 82, AV (solids) of 36.6, Viscosity of 2 stokes, and G.C. of 6+.

Step B. Synthesis of allyloxypropanol modified alkyd

| Component | Grams |
| --- | --- |
| A) Sunflower oil | 1108 |
| mono-pentaerythritol | 247 |
| 2% Lithium Ten Chem$^a$ | 3 |
| Triphenylphosphite | 4 |
| B) Pamolyn 300 | 140 |
| The reaction product of one equivalent trimellitic anhydride and two equivalents allyloxypropanol | 317 |
| Toluene | 43 |
| C) Phthalic anhydride | 184 |
| Isophthalic acid | 174 |
| D) Mineral spirits to 90 NV | 208 |

$^a$2% Lithium Ten Chem; a mixture of 60% Lithium Neodecanoate, 33% water, 5% diethylene glycol mono ethyl ether, and 2% ethyleneglycol When all ingredients are added together into a reactor, it is highly probable that there may be a significant loss of allyloxypropanol from a reactor through reflux during the alkyd synthesis, since low to medium molecular weight allyloxypropanols have their boiling temperatures lower than the typical alkyd synthesis temperature of 210°–250° C., and the secondary hydroxy allyloxypropanol, which reacts reluctantly with the carboxy compound, tends to be left unreacted in a reactor for an extended period time. The adduct formation of allyloxypropanol with trimellitic anhydride prior to the alkyd synthesis eliminates the problem associated with a direct reaction of allyloxypropanol with the carboxy compound, while reducing the reflux of allyloxypropanol significantly.

Component A was charged into a three liter reaction flask and the temperature was raised to about 249° C. The temperature was maintained for about 6 hours, then decreased to about 177° C. for addition of Component B. The temperature was raised again to about 221° C. and maintained until AV reached below 10. Component C was added and the temperature was held at about 221° C. until AV reached below 10. After toluene was removed from the reactor, the product was cooled to about 177° C. and diluted with Component D to 90 NV. The resulting resin had an NV of 90.4, AV (solids) of 8.6, Viscosity of 115 stokes, and G.C. of 6+.

Step C. Blending of alkyd and reactive diluent

| Component | Grams |
| --- | --- |
| Reactive diluent from Step A | 255 |
| Alkyd from Step B | 600 |

The blend had an NV of 88.8, AV (solids) of 16.9, Viscosity of 31.8 stokes, and G.C. of 6. This is an example of an alkyd composition prepared with 39% drying oil and fatty acid, 29% allyloxypropanol, 20% polyol, 11% aromatic acid.

EXAMPLE 6

Synthesis of Allyloxypropanol Modified Alkyd Using a Single Stage Process

| Component | Grams |
| --- | --- |
| A) Trimellitic anhydride | 35 |
| Phthalic anhydride | 73 |
| Allyloxypropanol (n + m = 1.73) | 176 |
| B) mono-pentaerythritol | 33 |
| Trimethylol ethane | 91 |
| Glycerine | 84 |
| Xylene | 15 |
| Dibutyltin diacetate | 2 |
| Triphenyl phosphite | 2 |
| C) Sunflower fatty acid | 303 |
| D) Mineral spirits to 90 NV | 17 |

Component A was charged into a two liter reaction flask equipped with a Barrett type water collector filled with saturated NaCl solution. The temperature was raised to 120° C. under a nitrogen stream and maintained for about 1.5 hours. The reactor was cooled to 65° C. and Component B was introduced. The temperature was increased to 204° C. and maintained until AV reached 20 while collecting forming water. The reactor was cooled to 138° C. for addition of Component C. The temperature was raised again to 204° C. and held until AV approached below 10. The product was cooled to about 93° C., then diluted with Component D to 90 NV. The resulting resin had an NV of 90.3, AV (solids) of 12.3, Viscosity of 165.5 stokes, and G.C. of 5. This is an example of an alkyd composition prepared with 38% drying fatty acid, 22% allyloxypropanol, 16% polyol, and 24% aromatic acid.

EXAMPLE 7

Synthesis of Allyloxypropoxylate Modified Alkyd with a Single-step Process.

Although employing the two separate reactors, the alkyd synthesis in this example can be carried out in the same reactor by adjusting the charge amount of each component in step A.

Step A. Synthesis of trimellitic anhydride modified carboxylated allyoxypropanol

| Component | Grams |
| --- | --- |
| A) Trimellitic anhydride | 900 |
| Allyloxypropanol (n + m = 1.94) | 737 |
| Triphenylphosphite | 4 |

| Component | Grams |
|---|---|
| B) Allyloxypropanol (n + m = 1.94) | 737 |

Component A was introduced to a three liter reaction flask equipped with a Barrette type water collector filled with saturated NaCl solution and toluene. The temperature was raised to 200° C. under a nitrogen stream and Component B was added into the reactor through an addition funnel over 2 hours. The temperature was maintained at 200° C. until the theoretical AV of 110 was obtained. The resulting modified allyloxypropanol had an NV of 90.0, AV of 114, viscosity of 14.5 stokes, and G.C. of 8—.

Step B. Synthesis of allyloxypropanol modified alkyd

| Component | Grams |
|---|---|
| A) Pamolyn 240 | 257 |
| mono-pentaerythritol | 83 |
| Isophthalic acid | 51 |
| Carboxylated allyloxypropanol from Step A | 298 |
| Dibutyltindiacetate | 1 |
| B) Mineral Spirits to 90 NV | 72 |

Component A was introduced to a two liter reaction flask equipped with a Barrette type water collector filled with saturated NaCl solution and toluene. The temperature was raised to 215° C. and held until the AV approached 20 while collecting forming water. The product was diluted with Component B and cooled to room temperature (R.T.) The resulting resin had an NV of 85.3, AV (solids) of 21.7, viscosity of 77.6 stokes, and G.C. of 7+.

This is an example of an alkyd composition prepared with 37% drying fatty acid, 27% allyloxypropanol, 12% polyol, and 24% aromatic acid.

EXAMPLE 8

Synthesis of Allyloxypropanol Modified Alkyd with a Multi-step Process

This example employs a multi-step process for the better control of the molecular structure of alkyd.

Step A. Synthesis of trimellitic anhydride modified carboxylated allyloxypropanol

| Component | Grams |
|---|---|
| A) Trimellitic anhydride | 1000 |
| Allyloxypropanol (n + m = 1.82) | 853 |
| Triphenylphosphite | 6 |
| B) Allyloxypropanol (n + m = 1.82) | 853 |

Component A was charged into a five liter reaction flask equipped with a Barrette type water collector filled with water and xylene. The temperature was raised to 120° C. and held for 1 hour. The temperature was increased to 200° C. and Component B was added into the reactor through an addition funnel over 3 hours while collecting forming water. The heating was continued at 200° C. until the theoretical AV (112) was obtained. The resulting allyloxypropanol intermediate had an NV of 90.0, AV (solids) of 118.0, Viscosity of 27.0 stokes, and G.C. of 5.

Step B. Synthesis of allyloxypropanol modified alkyd

| Component | Grams |
|---|---|
| A) Sunflower fatty acid | 500 |
| mono-pentaerythritol | 122 |
| B) Carboxylated allyloxypropanol from Step A | 895 |
| C) Mineral spirits to 90 NV | 100 |

Component A was charged into a three liter reaction flask equipped with a Barrette type water collector filled with water and xylene. The temperature was increased to 230° C. and held until the AV reached below 5. Component B was added into the reactor and the temperature was maintained at 200° C. until the AV reached below 10. After being diluted with Component C, the product was cooled to R.T. The resulting alkyd had an NV of 89.8, AV (solids) of 16.1, Viscosity of 11.5, and G.C. of 6+.

This is an example of an alkyd composition prepared with 33% drying fatty acid, 37% allyloxypropanol, 8% polyol, and 22% aromatic acid.

EXAMPLE 9

Synthesis of Allyloxypropanol Alkyd Using a Multi-step Process

Step A. Synthesis of hydroxy terminated intermediate to be reacted with carboxy terminated allyloxypropanol compound

| Component | Grams |
|---|---|
| A) Sunflower fatty acid | 1314 |
| Isophthalic acid | 260 |
| Trimethylolpropane | 210 |
| mono pentaerythritol | 216 |
| Triphenyl phosphite | 4 |
| B) Mineral spirits to 90 NV | 193 |

Component A was introduced into a three liter reaction flask. The temperature was increased to 226°–232° C. and held until the AV reached below 10. The product was cooled to about 90° C. and diluted with Component B. The resulting dihydroxy intermediate had an NV of 90.8, AV (solids) of 7.4, Viscosity of 6.1 stokes, and G.C. of 1.

Step B. Synthesis of carboxy terminated allyloxypropanol to be reacted with dihydroxy intermediate The same material described in Step A of Example 7 was used.

Step C. Synthesis of allyloxypropanol modified alkyd from two intermediate compounds prepared in separate steps

| Component | Grams |
|---|---|
| A) Dihydroxy intermediate from Step A | 730 |
| Carboxy intermediate from Step B | 618 |
| Dibutyltindiacetate | 2 |
| B) Mineral spirits to 90 NV | 30 |

Component A was charged into a three liter reaction flask equipped with a Barrette type water collector filled with water and xylene. The temperature was increased to 220° C. under a nitrogen stream and held until the AV was below 10 while collecting forming water. The product was cooled and diluted with Component B. The resulting alkyd had an NV of 90.5, AV (solids) of 18.3, Viscosity of 29.7 stokes, and G.C. of 7.

This is an example of an alkyd composition prepared with 36% drying fatty acid, 29% allyloxypropanol, 11% polyol, and 24% aromatic acid.

Viscosity of the formulated paint was also measured with the ICI Cone and Plate Viscometer.

The results in Table II clearly demonstrate that the present invention provides low VOC alkyds having good drying properties without causing the yellowing observed in the conventional low VOC alkyd.

TABLE I

A Paint Formulation for Allyloxypropanolated and Conventional Alkyds (high pigment to binder ratio)

|  | Blend from Example 5 | Alkyd from Example 8 | Alkyd from Example 9 | Conventional Alkyd[a] with Low VOC |
|---|---|---|---|---|
| Component A |  |  |  |  |
| Resin | 117.4 | 117.4 | 117.4 | 117.4 |
| Thixatrol ST | 1.8 | 1.8 | 1.8 | 1.8 |
| R-900 (TiO$_2$) | 106.3 | 106.3 | 106.3 | 106.3 |
| Omyacarb 6 (CaCo$_3$) | 194.9 | 194.9 | 194.9 | 194.9 |
| Mineral Spirits | 17.7 | 17.7 | 17.7 | 17.7 |
| Grind for 10 min. at 140° F. |  |  |  |  |
| Component B |  |  |  |  |
| Resin | 81.0 | 81.0 | 81.0 | 81.0 |
| Manosec CD-44 | 6.0 | 6.0 | 6.0 | 6.0 |
| (a mixture of Co, Li, and Ca) |  |  |  |  |
| 5% Ca Naphthenate | 7.0 | 7.0 | 7.0 | 7.0 |
| Drymax (proprietary composition) | 0.4 | 0.4 | 0.4 | 0.4 |
| Anti-skinning agent | 1.8 | 1.8 | 1.8 | 1.8 |
| Mineral Spirits | 61.9 | 61.9 | 61.9 | 61.9 | a. Alkyd based on trimellitic anhydride, phthalic anhydride, pentaerythritol, and fatty acids.

EXAMPLE 10

Preparation of Semi-gloss Interior Paints and Evaluation of Their Coating Properties Table I contains comparative paint formulations. Component A was mixed with a high shear blade to form a paste. After the formed paste was heated at 140° F. for 10 minutes, Component B was added to prepare the paint.

For the dry time measurement, the prepared paint was applied on a lacquered opacity chart at 2.5 mil, 5.0 mil, and 8.0 mil wet thickness. A Zapon tack free test with 200 g load and a thumb twist test (Federal Specification 141) were employed to measure the thin film dry (2.5 mil thickness) and the thick film dry (5.0 mil and 8.0 mil thickness), respectively.

Since an alkyd paint yellows over a long period of time at ambient conditions, two accelerated tests were designed to predict its tendency to yellowing. The paint was applied on the lacquered opacity chart at 3.0 mil wet thickness and allowed to dry for 1 week before testing. The first accelerated yellowing test is to expose the panel to 120° F. for five days and the second one is to expose the panel to ammonia fumes in a closed container.

The yellowing of the exposed panel was determined by the yellowness index (Y.I.) (ASTM E313) which is calculated according to the following equation based on Hunter b (yellow-blue) and L (light-dark) values as measured on a Gardner XL 20 Colorimeter.

$$Y.I. = 142.9 \times \frac{b}{L}$$

Generally, as a film yellows, the L value decreases and the b value increases to give a higher Y.I. value. The Viscosity of the formulated paint was measured with the Krebs-Stormer Viscometer (ASTM D 562). The results are expressed in KU (Krebs Units). The

TABLE II

The Paint Evaluation Results for Alkyds with High Pigment to Binder Ratio

|  | Blend from Example 5 | Alkyd from Example 8 | Alkyd from Example 9 | Conventional Alkyd with Low VOC |
|---|---|---|---|---|
| VOC (lb/gal) | 2.38 | 2.33 | 2.32 | 2.30 |
| ICI viscosity (poise) | 5.6 | 2.4 | 4.4 | 5.0 |
| K.U. | 104 | 84 | 98 | 90 |
| Dry time (hours) |  |  |  |  |
| 2.5 mil thickness | 25½ | 27½ | 26¾ | 7 |
| 5.0 mil thickness | 24–32 | 24–32 | 24–32 | 48 |
| 8.0 mil thickness | 72–76 | 53–72 | 53–72 | 120 |
| Initial Y. I. | 3.84 | 3.69 | 3.52 | 3.65 |
| Y.I. after accelerated yellowing tests |  |  |  |  |
| 6 hours Ammonia | 7.71 | 7.71 | 7.08 | 11.40 |
| 120 hours, 120° F. oven | 7.19 | 6.43 | 5.80 | 7.63 |

EXAMPLE 11

Preparation of High Gloss Interior Paints and Evaluation of Their Coating Properties.

Table III contains additional comparative paint formulations. Component A was ground to Hegman Scale #7 and Component B was added to the paste. A prepared coating composition was applied on glass for dry time measurement and on lacquered opacity chart paper for the accelerated yellowing tests. Dry time for the example was obtained with Gardner Circular Dry Time Apparatus with 12 g load and a circulation speed of one revolution per 24 hours, in which the character of the marks made by the stylus is related to the drying of the film. Dry through time is the time period required for the groove to form a single line. When the tendency to form a permanent groove has ceased, the film was considered dry hard.

The evaluation results in Table IV support the uniqueness of the present invention that the allyloxypropanol modified alkyd shows a combination of good dry and yellowing resistance at low VOC formulation.

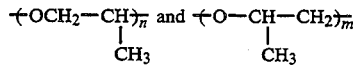

TABLE III

A Paint Formulation for Allyloxypropanolated and Conventional Alkyds (low pigment to binder ratio)

| | Blend from Example 3 | Blend from Example 4 | Alkyd from Example 6 | Alkyd from Example 7 | Conventional Low VOC Alkyd[b] |
|---|---|---|---|---|---|
| Component A | | | | | |
| Resin | 122.0 | 125.2 | 122.3 | 129.4 | 126.3 |
| Mineral Spirits | 10.0 | 10.0 | 10.0 | 10.0 | 32.4 |
| Rheological additive[a] | 2.0 | 2.0 | 2.0 | 2.0 | 2.5 |
| R-900 (TiO2) | 150.0 | 150.0 | 150.0 | 150.0 | 126.1 |
| OMYACARB-UF (CaCo3) | 60.0 | 60.0 | 60.0 | 60.0 | 50.5 |
| 6% Ca Naphthenate | 4.6 | 4.6 | 6.9[c] | 6.9[c] | 3.9 |
| Grind to Hegman Scale #7 | | | | | |
| Component B | | | | | |
| Resin | 187.1 | 191.9 | 187.5 | 198.5 | 112.6 |
| 6% Co Naphthenate | 2.3 | 2.3 | 2.3 | 2.3 | 2.0 |
| 6% Zr Naphthenate | 4.6 | 4.6 | 4.6 | 4.6 | 3.9 |
| Dri-Rx (2.2'-Bipyridyl) | 0.6 | 0.6 | 0.6 | 0.6 | 0.5 |
| Anti-skinning agent (ASA #2) | 1.2 | 1.2 | 1.2 | 1.2 | 1.0 |
| Mineral Spirits | 0 | 0 | 0 | 0 | 34.9 |

[a]Thixastrol ST except for the conventional low VOC alkyd where Bentone SD-1 was used.
[b]Low VOC alkyd based on sunflower oil, trimellitic anhydride, trimethylolpropane, and isophthalic acid.

TABLE IV

The Paint Evaluation Results for Alkyds with Low Pigment to Binder Ratio

| | Blend from Example 3 | Blend from Example 4[a] | Alkyd from Example 6[a] | Blend from Example 7[a] | Conventional Low VOC Alkyd[a] |
|---|---|---|---|---|---|
| VOC (lb/gal) | 1.84 | 1.39 | 2.33 | 2.55 | 2.09 |
| 120 hrs., 120° F. oven | 7.01 | 14.49 | 11.49 | 13.57 | 13.38 |
| K. U. | N/A | N/A | 115 | 108 | N/A |
| Dry time (Gardner) (DT/DH[b] hours) | | | | | |
| 1.5 mil thickness | 5.7/9.9 | 5/22 | 6/17 | 5/6 | 3/24+ |
| 3.0 mil thickness | 9.0/24+ | 7/24 | 9/23 | 5/16 | 6/24+ |
| Initial Y. I. | 4.33 | 3.63 | 3.01 | 3.74 | 3.57 |
| Y.I. after accelerated yellowing tests | | | | | |
| 6 hours Ammonia | 13.17 | 31.57 | 25.00 | 28.54 | 31.99 |

[a]Accelerated tests were performed in about 3 months after film was drawn.
[b]DT: Dry through, DH: Dry hard

What is claimed is:

1. An alkyd resin containing allyloxypropanol and drying oil compound residues in the resin chain.

2. The alkyd resin of claim 1 comprising the reaction product of a mixture comprising from 10 to 50 percent of allyloxypropanol, prereacted with an acid or acid anhydride and from 10 to 50 percent of drying oil compound.

3. The alkyd resin of claim 1 comprising the reaction product of a mixture comprising 25 to 50 percent by weight of drying oil, from 10 to 40 percent by weight allyloxypropanol, from 5 to 30 percent by weight aromatic acid and from 5 to 20 percent by weight polyhydroxy compound.

4. The resin composition of claim 1 wherein the allyloxypropanol has the formula:

$$CH_2=CH-CH_2-R-OH$$

where R is a mixture of

where n+m is from greater than 1 to 10.

5. The composition of claim 4 where n+m is less than 10.

6. A coating composition comprising the compound of claim 1 in combination with zero to 50 percent by weight of the coating polymer of a volatile solvent.

7. A coating composition comprising the compound of claim 1 in combination with zero to 20 percent by weight of the coating polymer of a volatile solvent.

8. A coating composition comprising the compound of claim 2 in combination with zero to 20 percent by weight of the coating polymer of a volatile solvent.

9. A coating composition comprising the compound of claim 3 in combination with zero to 20 percent by weight of the coating polymer of a volatile solvent.

10. A coating composition comprising the compound of claim 4 in combination with zero to 20 percent by weight of the coating polymer of a volatile solvent.

11. A cured film from the composition in claim 6.
12. A cured film from the composition in claim 7.
13. A cured film from the composition in claim 8.
14. A cured film from the composition in claim 9.
15. A cured film from the composition in claim 10.

16. The composition of claim 6 wherein from 0.01 to 5 percent by weight of a drying catalyst is present in the composition.

17. The composition of claim 7 wherein from 0.01 to 6 percent by weight of a drying catalyst is present in the composition.

18. The composition of claim 8 wherein from 0.01 to 5 percent by weight of a drying catalyst is present in the composition.

19. The composition of claim 9 wherein from 0.01 to 5 percent by weight of a drying catalyst is present in the composition.

20. An allyloxypropanol having the formula:

$$CH_2=CH-CH_2-R-OH$$

where R is a mixture of

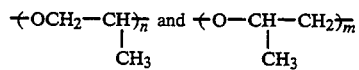

where $n+m$ is greater than 1.

21. The allyloxypropanol of claim 20 where $n+m$ is less than 10.

* * * * *